J. E. HOGANDER.
TRUCK.
APPLICATION FILED SEPT. 16, 1918.
1,316,239.
Patented Sept. 16, 1919.
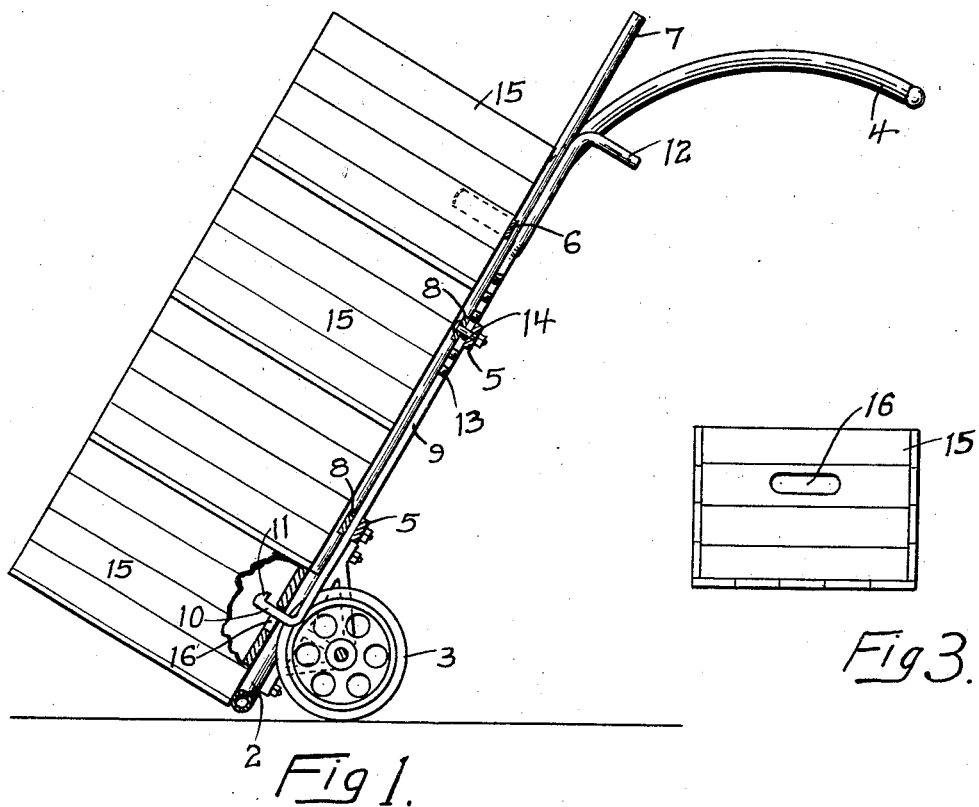
Fig 1.
Fig 3.
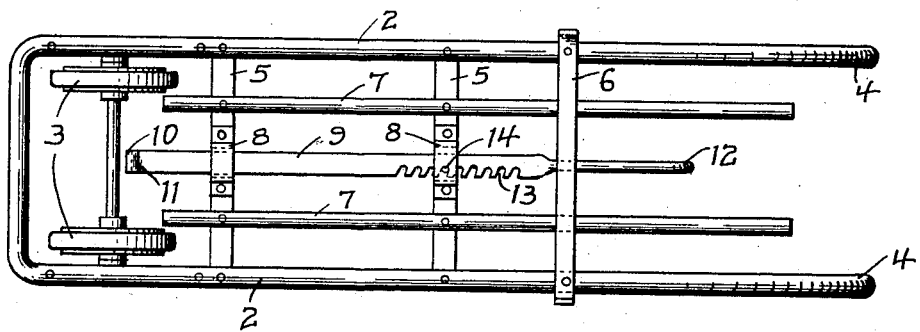
Fig 2.
INVENTOR
John E. Hogander
BY Paul & Paul,
ATTORNEYS

UNITED STATES PATENT OFFICE.

JOHN E. HOGANDER, OF MINNEAPOLIS, MINNESOTA.

TRUCK.

1,316,239.  Specification of Letters Patent.  Patented Sept. 16, 1919.

Application filed September 16, 1918. Serial No. 254,321.

*To all whom it may concern:*

Be it known that I, JOHN E. HOGANDER, a citizen of the United States, resident of Minneapolis, county of Hennepin, State of Minnesota, have invented certain new and useful Improvements in Trucks, of which the following is a specification.

My invention relates to platform or warehouse trucks and the object of the invention is to provide an attachment by means of which a series of cases or boxes, such as are used for shipping milk, when piled one upon the other may be easily lifted and moved from place to place without the necessity of handling each case separately, or tilting the pile to insert the end of the truck thereunder.

The invention consists generally in various constructions and combinations, all as hereinafter described and particularly pointed out in the claims.

In the accompanying drawings forming part of this specification,

Figure 1 is a sectional view illustrating the manner of using my improved truck, Fig. 2 is a top view of the same, Fig. 3 is an end view of the case or box, showing the opening to receive the lifting hook of the truck.

In the drawing, 2 represents the frame of the truck, supported upon carrying wheels 3 and provided at one end with downwardly turned handles 4. The frame of the truck may be made of tubing or any other suitable material, as preferred. 5 represents cross bars arranged in parallel relation between the side rails of the truck, preferably on the underside thereof, and 6 is a bar mounted on the side rails near the handles 4. Bars 7 are arranged parallel with the side rails of the truck and are secured to the bars 5 and extend under the bar 6. Loops 8 are mounted on the cross bar 5 and form guides for a bar 9 that is slidable therein. The lower end of this bar 9 has an outwardly turned portion 10 forming a hook that is provided with a shoulder 11, and the other end of the bar 9 has a hand grip 12 thereon mounted intermediate to the bar 7. The bar 9 has notches 13 in one edge adapted to receive a pin 14 which extends across the loop opening on the upper bar 5 under the loop 8 thereon and the bar 9 is adjustable lengthwise in the truck by means of these notches and pin, so that its lower end may be moved toward the end of the truck or withdrawn therefrom, as preferred. 15 represents a case, in which milk bottles are packed, having slots 16 for hand grips in the ends thereof, and the bar 9 is adjusted in the truck so that the hook 10 will enter the slots 16 and then by tilting the truck downward, the user may raise the pile of cases or boxes from the truck and move them from place to place in the warehouse or on a platform. This hook device forms the entire support for the cases. Generally trucks of this kind have an outwardly turned lower portion that is inserted between the floor and the bottom case of the pile, and it is necessary to first tilt the cases away from the truck to allow the insertion of the lower end beneath them, but with my improvement this outwardly turned end is entirely omitted, the end rail of the truck frame forms a cross bar connection between the side rails and does not project forwardly beyond the rails, as shown in Fig. 1, the cases being engaged by the hooked bar and supported thereby when the truck is tilted, and it is unnecessary to tilt the cases to engage them with the hook. For cases where the slots are different distances from the ground the bar 9 is adjusted so that the hook will enter the slots and lift the cases when the truck is tilted.

To unload the cases, it is only necessary, of course, to swing the pile to a vertical position so that the bottom case will rest upon the floor and then the truck may be pulled back until the hook is disengaged from the opening in the case.

This device is particularly useful where there are a series of stacks or bundles piled together in a warehouse or platform and where it would not be possible to tilt one stack to insert the nose or projection of an ordinary truck under the stack until the stack was pulled out away from the others. This, of course, would involve the expenditure of considerable extra time and labor. With my improvement it is only necessary to push the frame of the truck up against the bottom box, insert the hook in the hand grip and then tilt the stack away from the others for movement of the truck to the desired transfer point.

I claim as my invention:

1. A truck comprising a frame having carrying wheels and lifting handles, the lower portion of said frame being adapted to be seated against the opposing wall of the package to be lifted, a hook projecting forwardly from said frame and having an upwardly turned end adapted to engage a hand grip in said opposing wall for lifting the package and the other packages piled thereon when said frame is tilted backwardly.

2. The combination, with a truck frame having carrying wheels at one end and lifting handles at the opposite end and against which frame the walls of a pile of boxes placed one upon the other are seated, and a bar mounted for longitudinal adjustment along the middle portion of said frame and having an outwardly turned lower end forming a hook to enter an opening in the wall of the lower box for lifting the pile when the truck is tilted.

3. A truck comprising a frame having carrying wheels and lifting handles, the lower portion of said frame being adapted to be seated against the opposing wall of the package to be lifted, a bar mounted in bearings lengthwise of said frame and near the middle portion thereof, and having a hooked lower end adapted to engage a hand grip in said opposing wall for lifting the package and the other packages piled thereon when said frame is tilted backwardly, and means for raising and lowering said bar to adjust said hook for hand grips of different height.

4. The combination, with a truck frame having carrying wheels and a lifting handle and cross bars mounted in said frame and guides formed thereon, of a bar slidable in said guides and having a hooked lower end to enter an opening in the wall of the lower box of the pile to be lifted, said bar having a series of notches formed therein and one of said guides having a pin to enter said notches.

5. A truck comprising a frame having carrying wheels and lifting handles, the lower portion of said frame being adapted to be seated against the opposing wall of the package to be lifted and a hook device projecting forwardly from the middle portion of said frame and adapted to engage a hand grip in said opposing wall for lifting the package and the other packages piled thereon when said frame is tilted backwardly.

6. A truck comprising a frame having carrying wheels and lifting handles, the lower portion of said frame being adapted to be seated against the opposing wall of the package to be lifted, a hook mounted on said frame and projecting forwardly therefrom and having an end portion to engage a hand grip in the opposing wall of the package for lifting the package and the other packages piled thereon when said frame is tilted backwardly.

In witness whereof, I have hereunto set my hand this 12th day of September, 1918.

JOHN E. HOGANDER.

Copies of this patent may be obtained for five cents each, by addressing the "Commissioner of Patents, Washington, D. C."